UNITED STATES PATENT OFFICE.

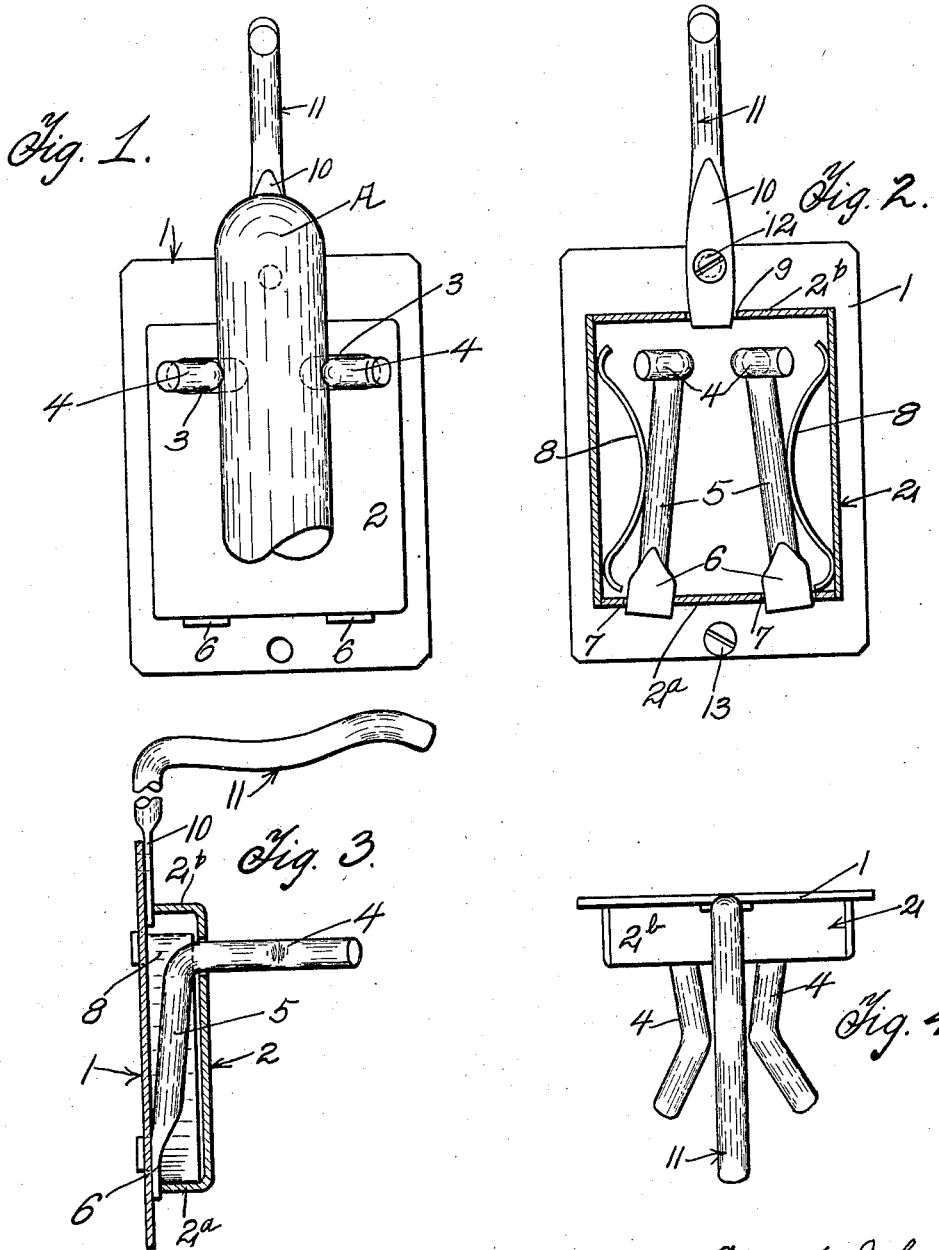

AUGUST JOHNSON, OF PITTSBURGH, PENNSYLVANIA.

HOLDING DEVICE.

1,388,043.  Specification of Letters Patent.  Patented Aug. 16, 1921.

Application filed February 5, 1921. Serial No. 442,818.

*To all whom it may concern:*

Be it known that I, AUGUST JOHNSON, a citizen of the United States, residing at Pittsburgh, in the county of Allegheny and State of Pennsylvania, have invented new and useful Improvements in Holding Devices, of which the following is a specification.

This invention relates to holding devices, and more particularly to a broom holder.

One of the main objects of the invention is to provide a device of the character stated of simple construction and operation adapted to grip the handle of a broom so as to suspend the same with the head down. A further object is to provide a device of this character consisting of a minimum of parts which are of simple but strong and durable construction. Further objects will appear from the detailed description.

In the drawings:

Figure 1 is a front view of the device as used.

Fig. 2 is a vertical sectional view.

Fig. 3 is a central vertical section view taken at right angles to Fig. 2.

Fig. 4 is a top plan view.

The device includes a base plate 1 upon which is secured a boxlike casing 2 provided adjacent to its upper end with spaced transversely extending slots 3. These slots receive gripping arms 4 formed integrally with, and disposed substantially at right angles to, rods 5 positioned within casing 2 and extending longitudinally thereof. Each of these rods is provided at its lower end with a flattened element 6 disposed in angular relation to the body of the rod so that the rod extends across casing 2 from front to back thereof as illustrated in Fig. 3. Flattened element 6 projects through a slot 7 in the lower wall 2ᵃ of casing 2, this slot being of such size as to permit rocking movement of the rods toward and away from each other. Bowed leaf springs 8 are confined between rods 5 and the side walls of the casing, these springs acting to normally hold the rods in such position that the gripping arms 4 are in contact with the front wall of casing 2 at the inner ends of slots 3. By forcing a broom handle A or similar article between arms 4, the handle is gripped so as to support the broom, and the article thus gripped may be readily removed from between the arms when desired.

Top wall 2ᵇ of casing 2 is provided with an opening 9 which receives the lower flattened end portion 10 of a hook 11 which is provided for supporting a dust cap or other article above the broom handle A. Flattened portion 10 of hook 11 is provided with an opening which registers with a similar opening in base plate 1, these openings receiving a securing screw 12, a similar screw 13 being inserted through the base plate at the lower end thereof. The screws 12 and 13 serve to secure the device to a suitable support, as will be understood, screw 12 also serving in conjunction with top wall 2ᵇ of casing 2 to effectively secure hook 11 in operative position.

What I claim is:—

1. In a device of the character described, a casing, rods mounted within the casing and disposed longitudinally of the same, said rods extending from front to back of the casing and being loosely connected at their lower ends to said casing for movement toward and away from each other, gripping members carried by the rods at the upper ends thereof, and leaf springs confined between the rods and the sides of the casing and acting to force said rods toward each other.

2. In a device of the character described, a casing provided in its front wall with spaced transversely extending slots, rods positioned within the casing and provided at their lower ends with flat angularly disposed elements projecting through openings in the bottom of the casing, said elements and the openings being adapted to permit movement of the rods toward and away from each other and the rods extending from the front to the back of the casing, gripping elements carried by said rods at the upper ends thereof and projecting through said slots, and leaf springs confined between the rods and the sides of the casing and acting to force said rods toward each other.

In testimony whereof I affix my signature.

AUGUST JOHNSON.